United States Patent
Wang et al.

(10) Patent No.: US 11,082,953 B2
(45) Date of Patent: Aug. 3, 2021

(54) USER EQUIPMENT, BASE STATION AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 69 days.

(21) Appl. No.: 16/499,224

(22) PCT Filed: May 4, 2017

(86) PCT No.: PCT/CN2017/083035
§ 371 (c)(1),
(2) Date: Sep. 27, 2019

(87) PCT Pub. No.: WO2018/201390
PCT Pub. Date: Nov. 8, 2018

(65) Prior Publication Data
US 2020/0107297 A1 Apr. 2, 2020

(51) Int. Cl.
*H04W 72/02* (2009.01)
*H04W 72/04* (2009.01)
(Continued)

(52) U.S. Cl.
CPC ....... *H04W 72/02* (2013.01); *H04W 72/0446* (2013.01); *H04W 72/082* (2013.01); *H04W 92/18* (2013.01)

(58) Field of Classification Search
None
See application file for complete search history.

(56) References Cited

U.S. PATENT DOCUMENTS 10,405,285 B2 * 9/2019 Seo ............... H04W 52/36
2020/0275458 A1 * 8/2020 Khoryaev ........... H04W 4/44

OTHER PUBLICATIONS

International Search Report of PCT application No. PCT/CN2017/083035 dated Jan. 25, 2018.
(Continued)

*Primary Examiner* — Ruihua Zhang
(74) *Attorney, Agent, or Firm* — Seed IP Law Group LLP

(57) ABSTRACT

Provided are a user equipment, base station and wireless communication methods related to resource pool sharing between UEs in different resource scheduling modes for sidelink communication. A user equipment which is operated in a base station-based scheduling mode for sidelink transmission comprises: circuitry operative to select candidate resources for at least data channels from resources in a resource selection window based on the result of sensing performed in a sensing window which is before the resource selection window, the beginning time of the resource selection window being no earlier than a service arrival time; and a transmitter operative to report at least part of the selected candidate resources to a base station, wherein the selection of the candidate resources follows at least one of the following rules: the time period from the service arrival time to the ending time of the resource selection window is no greater than a threshold latency; for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and asso- (Continued)

ciated radio parameters meet a Channel Business Ratio (CBR) requirement.

17 Claims, 6 Drawing Sheets

(51) Int. Cl.
    *H04W 92/18*     (2009.01)
    *H04W 72/08*     (2009.01)

(56)     References Cited

OTHER PUBLICATIONS

R1-1704686, "Sharing Resource Pool for eNB-controlled and UE-autonomous V2V Transmissions Modes", 3GPP TSG RAN1 WG Meeting #88bis, Apr. 2017.

* cited by examiner

USER EQUIPMENT, BASE STATION AND WIRELESS COMMUNICATION METHOD

BACKGROUND

1. Technical Field

The present disclosure relates to the field of wireless communication, and in particular, to a user equipment (UE), a base station (eNodeB) and wireless communication methods related to resource pool sharing between UEs operated in different resource scheduling modes for sidelink communication.

2. Description of the Related Art

In eV2X (enhanced Vehicle to anything) communication, there are defined different resource scheduling modes for sidelink transmission. For example, mode 3 refers to a base station-based scheduling mode, which can also be called a sidelink resource selection mode based on eNodeB scheduling. Furthermore, mode 4 is a sidelink resource selection mode based on UE autonomous scheduling based on sensing.

Generally, multiple resource pools are (pre)configured and each of the multiple resource pools is operated by one mode. For example, a first resource pool is configured for mode 3 and a second resource pool is configured for mode 4. In this case, the first resource pool cannot be used by UEs operated in mode 4 (which are also called mode-4 UEs hereinafter) and the second resource pool cannot be used by UEs operated in mode 3 (which are also called mode-3 UEs hereinafter). Considering that the resource pool configuration is static or semi-static, low resource utilization may be resulted. Further, in some cases, even if the load of one resource pool is low, it cannot be used for UEs in another resource pool, i.e. UEs operated in another mode.

Thus, in order to improve resource utilization, resource pool sharing between mode-3 UEs and mode-4 UEs is one objective in eV2X work item.

SUMMARY

One non-limiting and exemplary embodiment facilitates providing resource pool sharing in sidelink transmission to improve resource utilization and reduce/avoid resource collision.

In a first general aspect of the present disclosure, there is provided a user equipment which is operated in a base station-based scheduling mode for sidelink transmission comprises: circuitry operative to select candidate resources for at least data channels from resources in a resource selection window based on the result of sensing performed in a sensing window which is before the resource selection window, the beginning time of the resource selection window being no earlier than a service arrival time; and a transmitter operative to report at least part of the selected candidate resources to a base station, wherein the selection of the candidate resources follows at least one of the following rules: the time period from the service arrival time to the ending time of the resource selection window is no greater than a threshold latency; for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement.

In a second general aspect of the present disclosure, there is provided a wireless communication method for a user equipment which is operated in a base station-based scheduling mode for sidelink transmission, comprising: selecting candidate resources for at least data channels from resources in a resource selection window based on the result of sensing performed in a sensing window which is before the resource selection window, the beginning time of the resource selection window being no earlier than a service arrival time; and reporting at least part of the selected candidate resources to a base station, wherein the selection of the candidate resources follows at least one of the following rules: the time period from the service arrival time to the ending time of the resource selection window is no greater than a threshold latency; for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement.

In a third general aspect of the present disclosure, there is provided a base station, comprising: a receiver operative to receive information for reporting candidate resources from a user equipment which is operated in a base station-based scheduling mode for sidelink transmission; and a circuitry operative to configure parameters for scheduling sidelink resources for the user equipment based on the information, wherein the reported candidate resources are at least part of the selected candidate resources for at least data channels which are selected by the user equipment from resources in a resource selection window based on the result of sensing performed in a sensing window which is before the resource selection window, the beginning time of the resource selection window being no earlier than a service arrival time, and wherein the selection of the candidate resources by the user equipment follows at least one of the following rules: the time period from the service arrival time to the ending time of the resource selection window is no greater than a threshold latency; for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
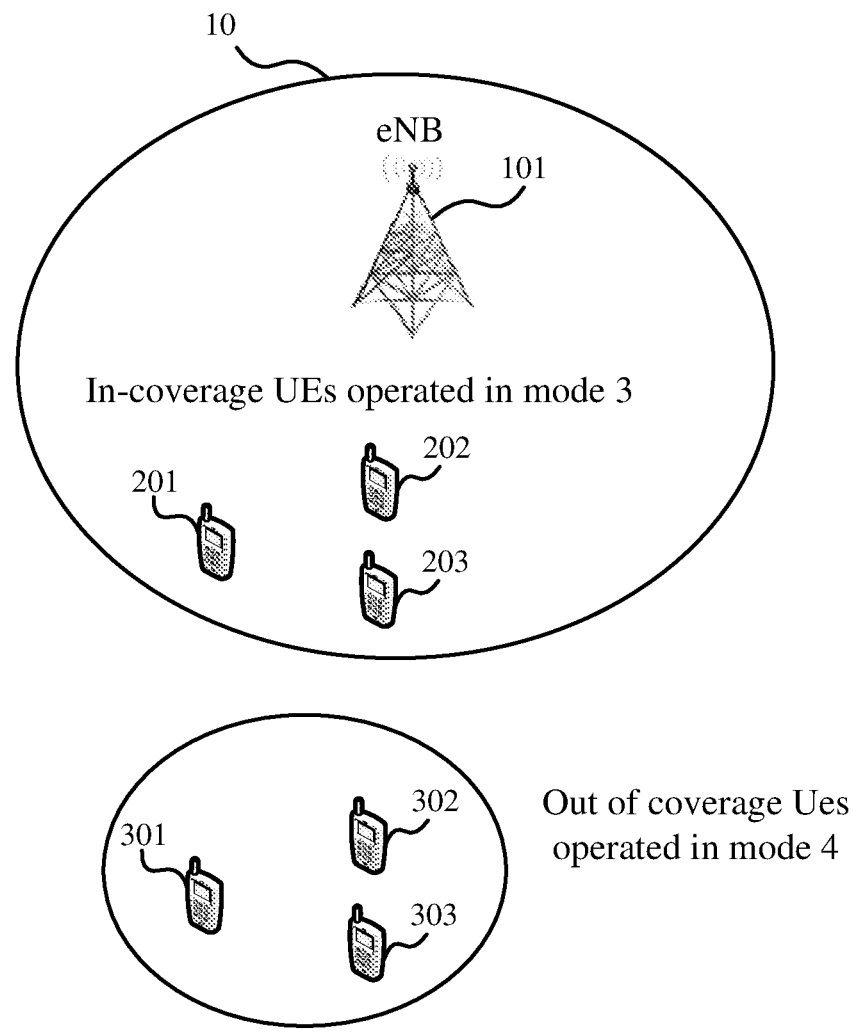
FIG. 1 schematically shows an exemplary scenario of collision between mode-3 UEs and mode-4 UEs which are close to a cell edge.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In addition to improving resource utilization, another motivation of resource pool sharing between mode-3 UEs and mode-4 UEs is to reduce or even avoid collisions for cell edge UEs. FIG. 1 schematically shows an exemplary scenario of collision between mode-3 UEs and mode-4 UEs which are close to a cell edge. As shown in FIG. 1, UEs 201, 202, 203 is in a cell 10 of eNB 101, that is to say, in the coverage of eNB 101. Here, it is assumed that UEs 201, 202, 203 are operated in mode 3. Also as shown in FIG. 1, UEs 301, 302, 303 are out of the coverage of eNB 101 but are close to the edge of the cell 10. Here, it is further assumed that UEs 301, 302, 303 are operated in mode 4.

In the case of FIG. 1, since UEs 301, 302, 303 are close to the edge of the cell 10, these out-of-coverage UEs may use the same resource pool as that of in-coverage UEs (i.e. UEs 201, 202, 203). Although mode-4 UEs may sense mode-3 UEs to avoid scheduling the resources scheduled for mode-3 UEs, mode-4 UEs do not report their resource allocation to eNb 101 and mode-3 UEs do not do sensing. Accordingly, eNB 101 does not know the resource allocation for mode-4 UEs at all, and thus transmission of mode-3 UEs allocated by eNB 101 may collide with transmission of mode-4 UEs. That is to say, in the scenario shown in FIG. 1, UEs 301, 302, 303 (in-coverage UEs operated in mode 3) and UEs 201, 202, 203 (out-of-coverage UEs operated in mode 4) may cause some collisions to each other.

Figure 2:
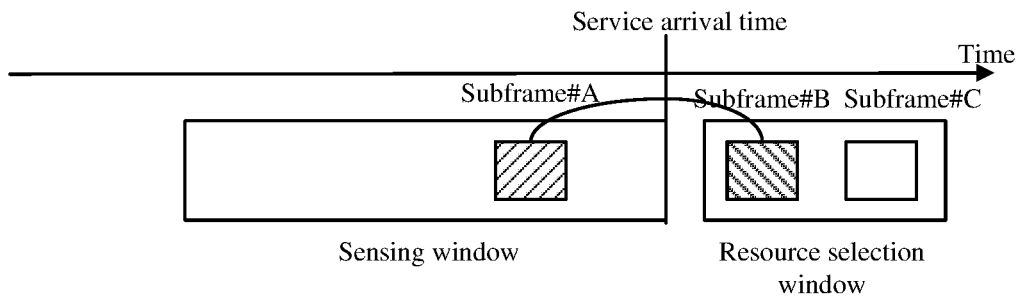
FIG. 2 schematically shows an example of a sensing and resource selection mechanism in V2X.

For convenience of understanding, a sensing and resource selection mechanism in V2X is introduced briefly in the following with reference to FIG. 2 which schematically shows an example of a sensing and resource selection mechanism in V2X. For example, based on Rel.14 specification, a mode-4 UE performs sensing in a sensing window first and then selects/predicts available resources in a resource selection window based on the result of the sensing. As shown in FIG. 2, with reference to a time axis represented by a right arrow, the sensing window is before the resource selection window in time.

Although it is shown in FIG. 2 that the service arrival time is aligned with the end of the sensing window, this is only for illustrative and the present invention is not limited thereto. There may be a time period between the end of the sending window and the service arrival time. Similarly, although it is shown in FIG. 2 that there are some time offsets between the service arrival time and the beginning time of the resource selection window, this is only for illustrative and the present invention is not limited thereto. In an ideal case, the service arrival time may be aligned with the beginning time of the resource selection window as will be described later.

Based on Rel.14 specification, for subframes that a mode-4 UE cannot monitor due to transmission and so on within the sensing window, relevant resources may not be selected within the resource selection window assuming a certain periodicity. FIG. 2 shows one example in which it is assumed that the UE cannot monitor subframe #A due to transmission in the sensing window, and thus relevant resources in subframe #B, which is relevant to subframe #A based on a certain periodicity, in the resource selection window cannot be selected for the service. If there is no any collision, the resources in subframe #C in the resource selection window can be selected for the service for example based on ranking of received Sidelink Received Signal Strength Indicator (S-RSSI) during the sensing window.

Considering UEs of different releases, resource pool sharing between mode-3 UEs and mode-4 UEs relates at least the following four different cases: 1) Rel.14 mode-3 UE and Rel.14 mode-4 UE; 2) Rel.14 mode-3 UE and Rel.15 mode-4 UE; 3) Rel.15 mode-3 UE and Rel.14 mode-4 UE; and 4) Rel.15 mode-3 UE and Rel.15 mode-4 UE. Release 14 is the currently used release and Rel.15 is currently under discussion. That is to say, for Rel.14 mode-3 UE and Rel.14 mode-4 UE, their configuration cannot be modified, while Rel.15 mode-3 UE and Rel.15 mode-4 UE can be designed for achieving the objective of resource pool sharing between them. Thus, cases 2)-4) are considered herein.

As described above with reference to FIG. 1, the current mechanism (Rel.14) cannot protect mode-3/mode-4 UEs very well since mode-3 UEs do not do sensing and eNB does not know mode-4 UEs' situation. Thus, the first choice is to configure a Rel.15 mode-3 UE to do sensing and to report candidate resources to eNB so that the eNB can select proper resources for the Rel.15 mode-3 UE based on the reported candidate resources (for cases 3) and 4)). Thus, how to trigger the candidate resource selection, how to select the candidate resources and how to report the candidate resources are needs to be considered for Rel.15 mode-3 UEs.

Figure 3:
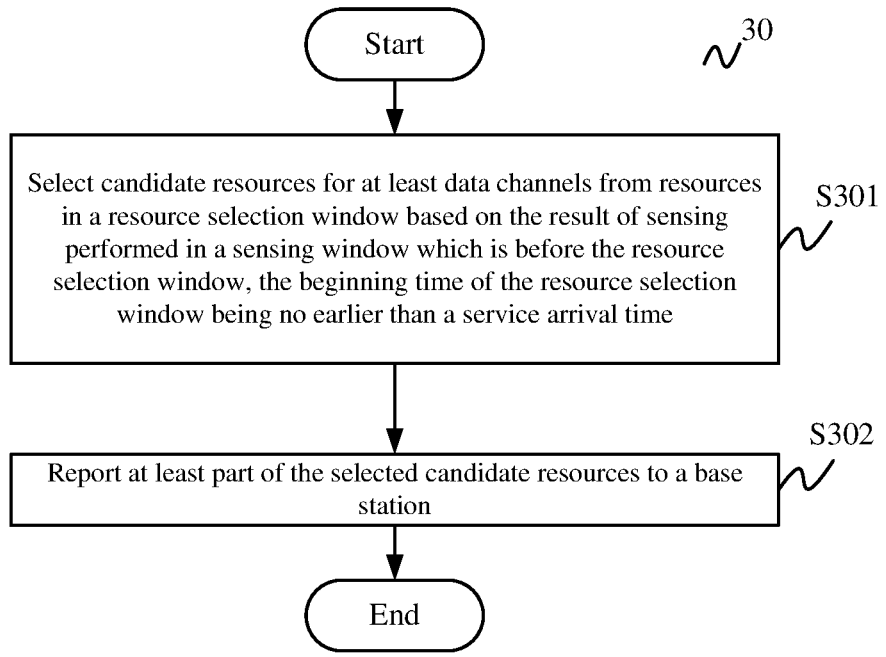
FIG. 3 illustrates a flowchart of a wireless communication method for a user equipment which is operated in a base station-based scheduling mode for sidelink transmission according to an embodiment of the present disclosure.

In an embodiment of the present disclosure, there is provided a wireless communication method 30 for a user equipment which is operated in a base station-based scheduling mode for sidelink transmission as shown in FIG. 3. FIG. 3 illustrates a flowchart of a wireless communication method for a user equipment which is operated in a base station-based scheduling mode for sidelink transmission according to an embodiment of the present disclosure. The user equipment may be for example a Rel.15 mode-3 UE.

As shown in FIG. 3, the wireless communication method 30 starts at step S301 in which candidate resources for at least data channels is selected from resources in a resource selection window based on the result of sensing performed in a sensing window which is before the resource selection window, the beginning time of the resource selection window being no earlier than a service arrival time. Then, at step S302, at least part of the selected candidate resources is reported to a base station. After step S302, the wireless communication method 30 ends. In the step S301, the selection of the candidate resources follows at least one of the following rules: the time period from the service arrival time to the ending time of the resource selection window is no greater than a threshold latency; for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement.

Specifically, for example, the base station may be eNB 101 as shown in FIG. 1 and the user equipment may be any one of UEs 201, 202 and 203 as shown in FIG. 1. That is to say, the wireless communication method 30 may be used by a mode-3 UE to report candidate resources to a base station in order for the base station to schedule proper resources for the mode-3 UE based on the reported candidate resources.

Here, the sensing and resource selection mechanism in step S301 is roughly similar as that described with reference to FIG. 1. Specifically, the sensing is first performed in a sensing window which is before a resource selection window. Since the principle and the operation of sensing are well known for those skilled in the art, details thereof are not discussed herein for avoiding confusion of the inventive points of the present disclosure. Then, the candidate resource selection is performed in the resource selection window based on the result of sensing. Detailed operations of the candidate resource selection will be discussed later.

It is noted that "select candidate resources for at least data channels" means that it is possible to select candidate resources for only data channels and accordingly to report candidate resources for only data channels. Alternatively, it is also possible to select candidate resources for both data channels and control channels and accordingly to report candidate resources for both data channels and control channels. Apparently, reporting candidate resources for only data channels can relatively save signaling overhead. However, the present disclosure is not limited thereto and whether to select and report candidate resources for control channels depends on specific requirements.

Figure 4:
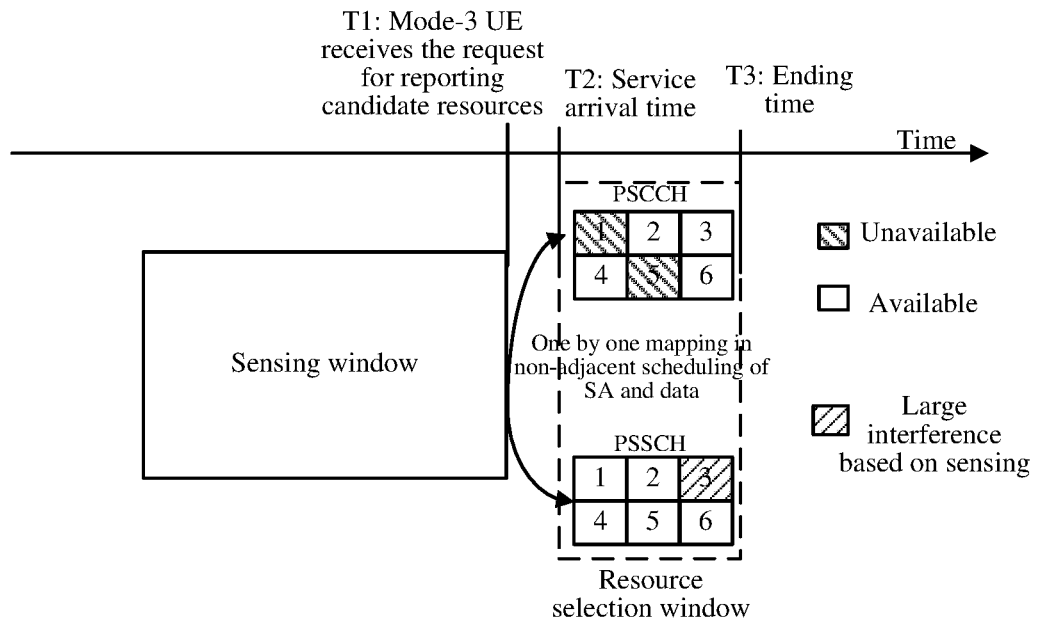
FIG. 4 schematically shows an example of a sensing and resource selection mechanism for a mode-3 UE in a case of non-adjacent scheduling between a data channel and a control channel.

In addition, "the beginning time of the resource selection window being no earlier than a service arrival time" means that the beginning time of the resource selection window may be later than the service arrival time by some time offsets, or may be just the service arrival time, as described above. More specifically, the case shown in FIG. 1 may be understand as one example where there are some offset between the service arrival time and the beginning time of the resource selection window, in which case, such time offsets may be used by UE to do some processing. FIG. 4 schematically shows an example of a sensing and resource selection mechanism for a mode-3 UE in a case of non-adjacent scheduling between a data channel and a control channel. As shown in FIG. 4, T2 represents a service arrival time which is aligned with the beginning time of the resource selection window, and such case may be understand as an ideal case as described above. It is noted that the time offsets between the service arrival time and the beginning time of the resource selection window may be designed depending on specific requirements.

In the following, detailed description is made on rules which should be followed in the selection of the candidate resources in the step S301 as described above. The first factor to be considered in selecting the candidate resources is latency requirement of service. Specifically, it is assumed that a threshold latency represents a tolerable maximum latency for the service. Thus, only those resources later than the service arrival time by no more than the threshold latency may be scheduled for the service in order to meet the latency requirement. Accordingly, the ending time of the resource selection window may be determined based on the service arrival time and the threshold latency. As described above, the time period from the service arrival time to the ending time of the resource selection window needs to be no greater than the threshold latency. For example, in the case shown in FIG. 4, T3 represents the ending time of the resource selection window, and the relationship between T2 and T3 should satisfies T3-T2≤ the threshold latency.

As described above, the beginning time of the resource selection window may be just the service arrival time (as shown in FIG. 4) or may be later than the service arrival time by some time offsets (as shown in FIG. 2), which depends on specific requirements. After the beginning time of the resource selection window is determined (based on the service arrival time and the time offsets (if any)) together with the ending time of the resource selection window, (the length of) the resource selection window is determined, and resources in the resource selection window may possibly be selected as candidate resources for mode-3 UEs for sidelink communication.

The second factor to be considered in selecting the candidate resources is sensing results of both data channels and control channels for a case of non-adjacent scheduling between a data channel and a control channel. As shown in FIG. 4, for convenience of explanation, it is assumed that there are six resources for Physical Sidelink Control Channel (PSCCH) indicated by 1, 2, 3, 4, 5, 6 respectively in the resource selection window and that there are six resources for Physical Sidelink Shared Channel (PSSCH) indicated by 1, 2, 3, 4, 5, 6 respectively in the resource selection window. Also, as represented by a bidirectional arrow, there is one-by-one mapping relationship between each pair of PSCCH resource and PSSCH resource, which are indicated by a same number.

In this case of non-adjacent transmission between PSCCH and PSSCH, UE needs to utilize sensing results to determine available resources in PSCCH channel and PSSCH channel respectively. Considering the one-by-one mapping between PSCCH and PSSCH, the resources for PSCCH and PSSCH are both considered unavailable as long as any one of them cannot be used due to for example large interference sensed from the sensing window. Taking FIG. 4 as an example, since resources 1 and 5 for PSCCH are not available due to for example the Sidelink Reference Signal Receiving Power (S-RSRP) received during the sensing window being large, resources 1 and 5 of PSSCH should also be precluded for candidate resources. Also, based on the sensing results in the sensing window, resource 3 for PSSCH is counted as unavailable due to the received S-RSRP being large in the sensing window. In this case, resources 2, 4, 6 for PSSCH can be selected as candidate resources for PSSCH.

Figure 5:
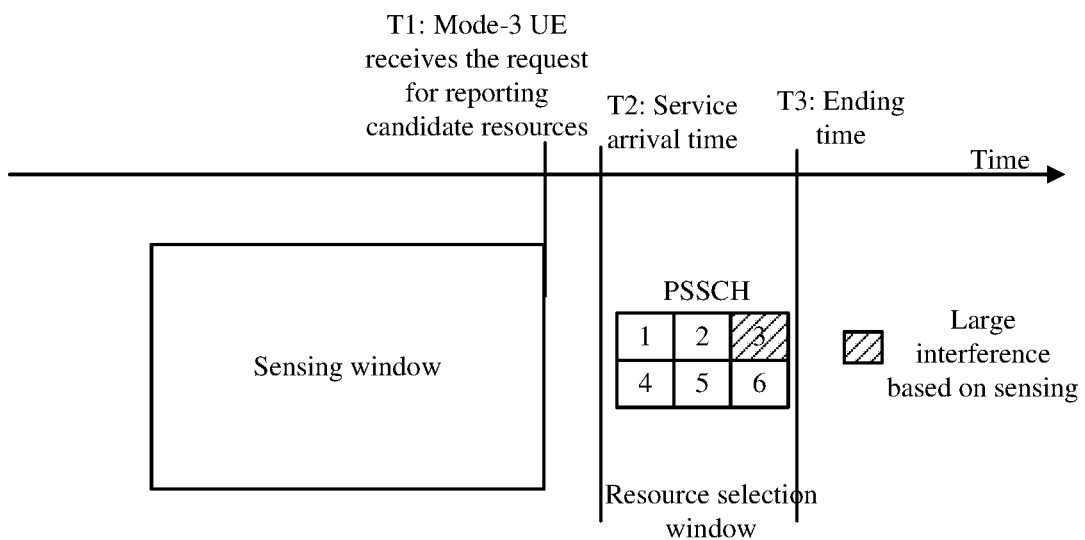
FIG. 5 schematically shows another example of a sensing and resource selection mechanism for a mode-3 UE in a case of adjacent scheduling between a data channel and a control channel.

FIG. 5 schematically shows another example of a sensing and resource selection mechanism for a mode-3 UE in a case of adjacent scheduling between a data channel and a control channel. Comparing FIG. 5 with FIG. 4, it can be seen that they are different only in that there is no PSCCH resources depicted in FIG. 5. This is because in the case of adjacent scheduling, PSCCH and PSSCH share the same subchannel and PSCCH is always transmitted at fixed position of PSSCH. That is to say, each PSCCH is transmitted in its corresponding PSSCH resource. Thus, a resource for PSSCH in the source selection window being available means that a resource for PSCCH is available too. Thereby, in this case, there is no need to consider control channel impact when UE selects and/or reports candidate resources for PSSCH. Taking FIG. 5 as an example, only resource 3 for PSSCH is unavailable due to the received RSRP being large in the sensing window. Thus, resources 1, 2, 4, 5, 6 may be selected as candidate resources for PSSCH.

The third factor to be considered in selecting the candidate resources is a CBR requirement. Specifically, the selected candidate resources and associated radio parameters should meet the CBR requirement. For example, the associated radio parameters such as Modulation and Coding Scheme (MCS), Physical Resource Block (PRB) number, retransmission number and power as well as Channel occupy Ratio (CR) should not exceed the CBR requirement according to the priority of packet. Assuming that current CBR requirement is {largest MCS: 16 QAM, PRB number limitation: 20, retransmission number limitation: 2, power limitation: 23 dBm} according to the priority of current packet, the associated radio parameters should not exceed such limitation required by CBR.

It is noted that, similarly with situation as described above with regard to the second factor, for a case of non-adjacent scheduling between a data channel and a control channel, CBR, CR and priority of both data channel and control channel should be considered. For a case of adjacent scheduling between a data channel and a control channel, CBR, CR and priority of only data channel needs be considered based on the same reason as above.

It is noted that the above three factors may all be considered when selecting candidate resources in the resource selection window, or any one or two of the three factors may be considered instead. Furthermore, in the selection of candidate resources in the resource selection window, any other factor may also be considered additionally depending on specific requirements.

In the step S302, "report at least part of the selected candidate resources" means that it is possible to report all of the selected candidate resources to the base station or to report some of the selected candidate resources to the base station. Whether to report part or all of the selected candidate resources depends on the report mode (pre)configuration. For convenience of understanding, FIG. 4 is taken as an example again. As described above, three resources 2, 4, 6 for PSSCH are selected as candidate resources. If the report mode (pre)configuration requires that 3 candidate resources may be reported, all of three resources 2, 4, 6 for PSSCH are reported finally to the base station. In contrast, if the report mode (pre)configuration requires that only 2 candidate resources are to be reported, only two of three resources 2, 4, 6 for PSSCH are reported finally to the base station. The latter case can save the signaling overhead as compared with the former case.

When the number of reported candidate resources is less than the number of selected candidate resources in the resource selection window, which ones of the selected candidate resources are to be reported may be up to UE implementation or based on certain metric like S-RSSI received in the sensing window. It is noted that which ones of the selected candidate resources are to be reported may also be based on any other suitable factors such as priority and the like.

In the following, an exemplary scenario where the above wireless communication method 30 may be applied is described with reference to FIG. 6 in order for better understanding of the wireless communication method 30.

Figure 6:
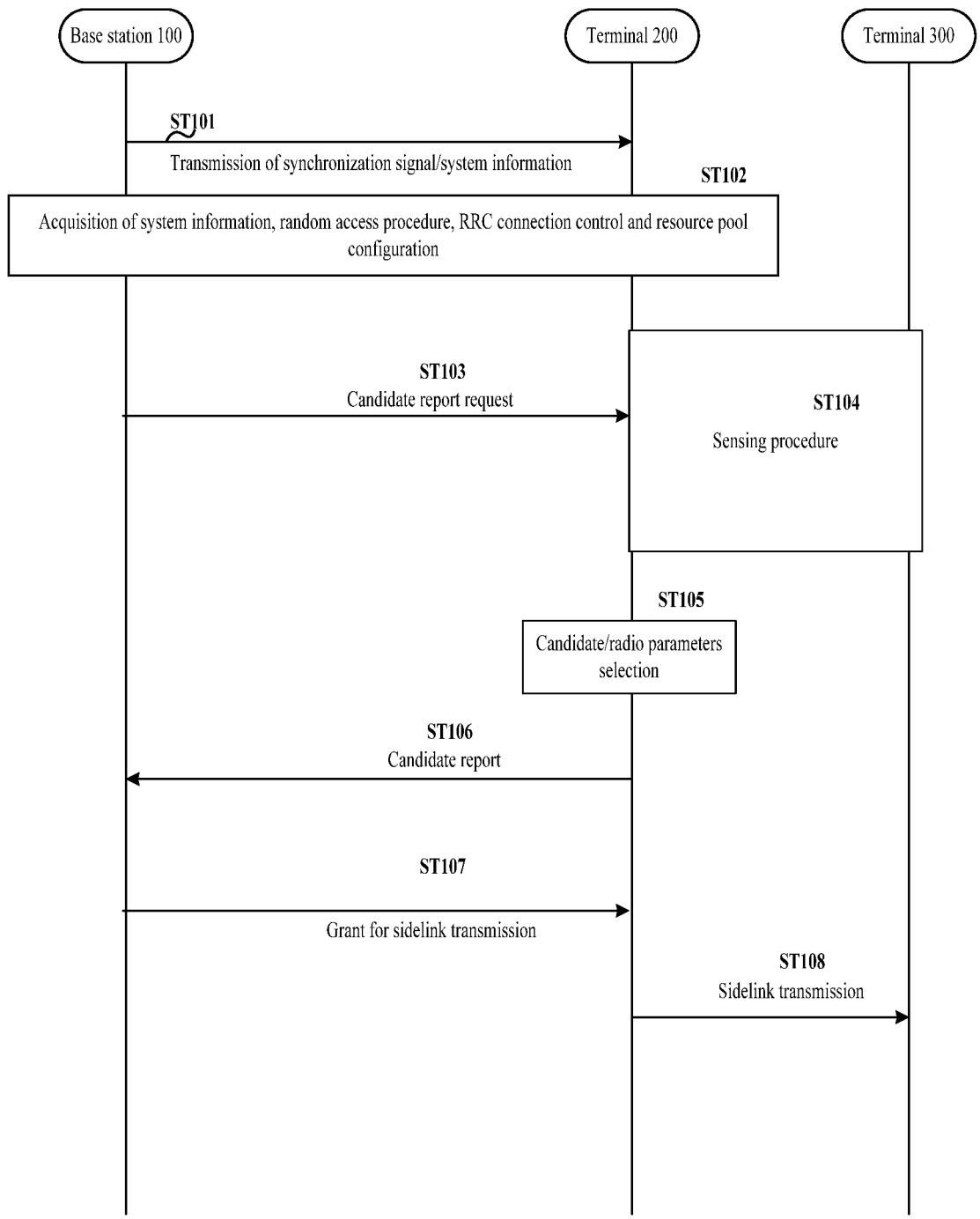
FIG. 6 schematically shows an example of a flowchart of resource scheduling for a user terminal operated in mode 3 for sidelink transmission according to an embodiment of the present disclosure.

FIG. 6 schematically shows an example of a flowchart of resource scheduling for a user terminal operated in mode 3 for sidelink transmission according to an embodiment of the present disclosure. For example, it is assumed that a user terminal (terminal) 200 is a Rel.15 mode-3 UE and a user terminal (terminal) 300 is a Rel.14/15 mode-4 UE.

As shown in FIG. 6, at step ST101, the base station 100 transmits synchronization signals and system information signals to the terminal 200. At step ST102, the base station 100 and the terminal 200 interact with each other to finish acquisition of system information, random access procedure, Radio Resource Control (RRC) connection control and resource pool configuration. The steps ST101 and ST102 are about synchronization, acquisition of system information, random access procedure, RRC connection control and resource pool configuration which are conventional steps in a normal wireless communication.

At step ST103, the base station 100 transmits a candidate report request to the terminal 200. At ST104, the terminal 200 perform a sensing procedure, which may corresponds to the sensing window shown in FIGS. 4 and 5. It is noted that, although FIGS. 4 and 5 show that the time T1 when mode-3 UE receives the request for reporting candidate resources is aligned with the end of the sensing window, the present disclosure is not limited thereto. As shown in FIG. 6, the candidate report request from the base station 100 may also reach the terminal 200 during the sensing procedure, that is, during the sensing window. There is no necessary time relationship between the sensing procedure performed at the terminal 200 and the transmission and/or reception of the candidate report request.

The function of the step ST103 is to trigger the candidate resource report from the terminal 200. Thus, based on the candidate report request transmitted at step ST103 from the base station 200, the terminal 200 performs candidate/radio parameters selection, which may corresponds to the resource selection window shown in FIGS. 4 and 5, at step ST105.

The step ST105 may also correspond to the step S301 in FIG. 3. Then, at step ST106, the terminal 200 transmits a candidate report to the base station 100. The step ST106 may correspond to the step S302 in FIG. 3.

At step ST107, the base station 100 transmits grant for sidelink transmission to the terminal 200. Then, the terminal 200 may perform sidelink transmission with the terminal 300. The grant for sidelink transmission transmitted at the step ST107 from the base station may be based on the candidate report transmitted at the ST106 from the terminal 200 so that the base station 200 may schedule proper resources for the terminal 200 for sidelink transmission in order to avoid collision with mode-4 UEs such as terminal 300.

With the wireless communication method 30, by selecting and reporting to a base station candidate resources by mode-3 UEs based on the result of sensing while considering at least one of the above three factors, the resource pool sharing between mode-3 UEs and mode-4 UEs can be realized while improving resource utilization and reducing/avoiding collisions between mode-3 UEs and mode-4 UEs.

Further, when all of the tree factors are considered, the candidate resources reported by using the wireless communication method 30 can guarantee proper sidelink transmission and satisfy CRB requirement and latency requirement.

According to an embodiment of the present disclosure, although not shown in FIG. 3, the wireless communication method 30 may further comprise reporting at least one of recommended MCS, PRB number, retransmission number and power associated with the reported candidate resources to the base station.

As described above, MCS, PRB number, retransmission number and power associated with the reported candidate resources may be used to meet CBR requirement. Thus, if at least one of recommended MCS, PRB number, retransmission number and power associated with the reported candidate resources based on the CBR requirement are reported additionally to the base station, the base station may take these parameters into consideration so as to determine the most suitable resources for the UE for sidelink transmission. Thereby, the performance of sidelink transmission may be improved and the resource pool sharing between mode-3 UEs and mode-4 UEs may be enhanced.

In an example, it is assumed that the mode-3 UE reports a retransmission number of 2 to the base station (eNB) for a recommended candidate resource (for example, one of the reported candidate resources). In this case, even if the retransmission number of 2 is known by the eNB for the recommended candidate resource, the eNB only knows there is retransmission for the current candidate resource but does not know the timing and frequency position of the retransmission. One solution for such an example may be that the eNB may combine any two candidate resources to schedule current transmission. The benefit of such solution is signalling overhead reduction, but the combined two candidate resources may not be aligned with the UE's recommendation, so the performance is not the optimal.

Another alternative solution for such an example may be that the mode-3 UE reports two candidate resources for every packet transmission involving retransmission to the eNB, that is, one candidate resource is used for initial transmission of a packet and another candidate resource is used for retransmission of the same packet. Thus, the eNB will clearly know the timing and frequency position of the retransmission with a cost of additional signaling overhead.

Alternatively, if the timing/frequency positions of retransmission and initial retransmission of a transport block or a packet is fixed/(pre)configured by eNB for example, for every packet transmission involving retransmission, the UE may report only the candidate resource for initial transmission and need not to report the candidate resource for retransmission. This is because that the relationship between the timing/frequency positions of retransmission and initial retransmission is fixed/(pre)configured, so that when the UE reports one candidate resource together with the associated retransmission number of 2, it means that both initial transmission and retransmission are available. It can save the report signalling but limit the flexibility of retransmission, as compared with the solution of reporting two candidate resources for every packet transmission involving retransmission.

According to an embodiment of the present disclosure, in the wireless communication method 30 as shown in FIG. 3, the granularity of the reported candidate resources is configured by the base station.

Specifically, as shown in FIGS. 4 and 5, each block indicated by one of 1, 2, 3, 4, 5, 6 may represent the granularity of the reported candidate resources. The each block in FIGS. 4 and 5 may correspond to for example one subchannel in one subframe, which is configured by the base station. It is noted that the granularity of the reported candidate resources is not limited to one subchannel in one subframe and may be several subchannel in several subframes and so on.

According to an embodiment of the present disclosure, in the wireless communication method 30 as shown in FIG. 3, the selection of the candidate resources is triggered by a signaling from the base station or by an event or condition. Specifically, as shown in FIGS. 4 and 5, T1 indicates the time when the mode-3 UE receives the request for reporting candidate resources from the base station (eNodeB). Such request can trigger the selection of the candidate resources in the resource selection window by the mode-3 UE. Such request may be transmitted by a signaling from the base station. For example, the signaling may be a physical layer signaling such as Downlink Control Information (DCI) or a higher layer signaling such as Radio Resource Control (RRC). It is noted that the present disclosure is not limited to DCI or RRC, and those skilled in the art may employ any other suitable signaling to trigger the selection of the candidate resources in the resource selection window by the mode-3 UE.

Alternatively, the selection of the candidate resources may also triggered by an event or condition instead of a signaling from the base station. For example, even if there is no trigger from the base station, the mode-3 UE may select and report to the base station candidate resources when it finds proper candidate resources. Also, if some condition is satisfied, the mode-3 UE may select and report to the base station candidate resources. Here, events and conditions for triggering the selection of the candidate resources in the resource selection window by the mode-3 UE may depend on specific circumstances.

According to an embodiment of the present disclosure, in the wireless communication method 30 as shown in FIG. 3, the at least part of the selected candidate resources is reported periodically or aperiodically.

Specifically, the reported candidate resources may be transmitted to the base station periodically, for example, one time per a certain period. Alternatively, the reported candidate resources may also be transmitted to the base station aperiodically, for example, based on a signaling from the base station or based on an event or condition as described above.

According to an embodiment of the present disclosure, in the wireless communication method 30 as shown in FIG. 3, the at least part of the selected candidate resources is reported after the resource selection window.

Specifically, the reporting of the recommended candidate resources by the mode-3 UE may be instantaneous, that is, short-term report. For example, as shown in FIGS. 4 and 5, after the resource selection window, the mode-3 UE can report recommended candidate resources based on the result of the selection in only this single resource selection window.

According to an embodiment of the present disclosure, in the wireless communication method 30 as shown in FIG. 3, the selection of candidate resources are performed over a plurality of resource selection windows, and after the plurality of resource selection windows, the at least part of the selected candidate resources is reported based on all of results of the selection of candidate resources performed over the plurality resource selection windows.

Specifically, the reporting of the recommended candidate resources by the mode-3 UE may also be long-term report. Although FIGS. 4 and 5 show only one sensing window and one resource selection window, the present disclosure is not limited thereto and there may be many sensing windows and corresponding resource selection windows. For the long-time candidate resource report, the mode-3 UE may measure multiple resource selection windows, that is to say, the selection of candidate resources are performed over every of the multiple resource selection windows. Then, the mode-3 UE recommends proper candidate resources for long term to the base station based on all results of the selection of candidate resources performed in the multiple resource selection windows (for example, by averaging).

According to an embodiment of the present disclosure, in the wireless communication method 30 as shown in FIG. 3, the beginning time and the ending time of the resource selection window is obtained by the base station implicitly from service statistics reported by the user equipment.

Specifically, for example, as shown in FIGS. 4 and 5, T2 (service arrival time) in this example is just the beginning time of the resource selection window and T3 represents the ending time of the resource selection window. It is assumed that the time T2 and T3 are known in both UE side and eNB side in the wireless communication method 30. The knowledge of T2 and T3 in eNB side may be implicitly obtained from UE's report on service statistics like service arrival time and latency requirement. More specifically, eNB may deduce the beginning time and the ending time of the resource selection window from for example the service arrival time and latency requirement in a case that there is no time offset between the service arrival time and the beginning time of the resource selection window. In addition, in a case that there is a time offset between the service arrival time and the beginning time of the resource selection window, UE may report the service arrival time, the time offset and the latency requirement, and eNB may deduce the beginning time and the ending time of the resource selection window from for example the service arrival time, the time offset and latency requirement.

According to an embodiment of the present disclosure, although not shown in FIG. 3, the wireless communication method 30 may further comprise reporting the beginning time and the ending time of the resource selection window to the base station.

Specifically, taking FIGS. 4 and 5 as an example again, the knowledge of T2 and T3 in eNB side may alternatively be obtained explicitly from UE's report. For example, UE will directly report T2 and T3 to eNB when reporting recommended candidate resources. Also, in a case that there is a time offset between the service arrival time and the beginning time of the resource selection window, UE may directly report the beginning time of the resource selection window instead of reporting the service arrival time together with the time offset.

It is noted that the present disclosure is not limited to eNB obtaining the knowledge of the beginning time and the ending time of the resource selection window implicitly or explicitly from UE. Alternatively, the beginning time and the ending time of the resource selection window may also be configured by base station. Therefore, in whatever option, UE and eNB should have same understanding on the resource selection window for candidate resource reporting.

According to an embodiment of the present disclosure, in the wireless communication method 30 as shown in FIG. 3, the at least part of the selected candidate resources may be reported by Physical Uplink Control Channel (PUCCH), in Media Access Control (MAC) layer or by RRC. In case of PUCCH based report, new Uplink Control Information (UCI) needs to be defined. It is noted that the reporting manner of the recommended candidate resources is not limited to the above examples and those skilled in the art may employ any other suitable reporting manner.

In the above, the wireless communication method 30 is described in detail with reference to FIGS. 3-6. With the wireless communication method 30, by selecting and reporting to a base station candidate resources by mode-3 UEs based on the result of sensing while considering at least one of the above three factors, the resource pool sharing between mode-3 UEs and mode-4 UEs can be realized while improving resource utilization and reducing/avoiding collisions between mode-3 UEs and mode-4 UEs.

It is noted that, the present disclosure may be applied to both a case of a single carrier and a case of multiple carriers. Apparently, in a case of a single carrier, there is no need to further indicate any carrier index, and the above wireless communication method 30 can be applied well. Since the single-carrier case is a relatively simple case and can be easily understand by those skilled in the art, details thereof will not be discussed here.

For the relatively complex multiple-carrier case, when the mode-3 UE reports to the base station recommended candidate resources (i.e. at least part of the selected candidate resources) by using the above wireless communication method 30, the UE should indicate a carrier index corresponding to each of recommended candidate resources to the base station in the meantime. Further, if it is assumed that the retransmission number is 2 for example as described above, since the initial transmission and retransmission for a same packet may be on a same carrier or may be on different carriers respectively, the UE may be needed to further indicate the carrier indexes for both the initial transmission and the retransmission when they are on different carriers.

The wireless communication method 30 as described above may be used to case 3) Rel.15 mode-3 UE and Rel.14 mode-4 UE, as well as case 4) Rel.15 mode-3 UE and Rel.15 mode-4 UE, since the wireless communication method 30 is directed to improve mode-3 UE. However, as to case 2) Rel.14 mode-3 UE and Rel.15 mode-4 UE, since the configuration of Rel.14 mode-3 UE is already fixed and cannot be modified anymore, the wireless communication method 30 is not applicable to this case.

Another embodiment of the present disclosure is to enhance case 2) Rel.14 mode-3 UE and Rel.15 mode-4 UE from mode-4 UE point of view. Specifically, it is known in the art that a Rel.14 mode-3 UE always sets "reservation period" as zero so Semi-Persistent Schedluling (SPS) operation of the Rel.14 mode-3 UE is not visible to Rel.15 mode-4 UEs. Thus, in order to protect the Rel.14 mode-3 UE especially on SPS operation, a UE whose reservation period is set as "zero" is seen as "fake SPS UE" and its periodicity is same as such mode-4 UE. The mode-4 UE will consider such "fake SPS UE" during the sensing procedure and preclude relevant resources during the resource selection window.

It is noted that, although the operation of the Rel.15 mode-4 UE can protect Rel.14 mode-3 UE on SPS operation, since it will consider a Rel.14 mode-3 UE on non-SPS operation as "fake SPS UE" too, some resources which are available actually for the Rel.15 mode-4 UE may be precluded too. Thus, the resource utilization may be reduced.

Figure 7:
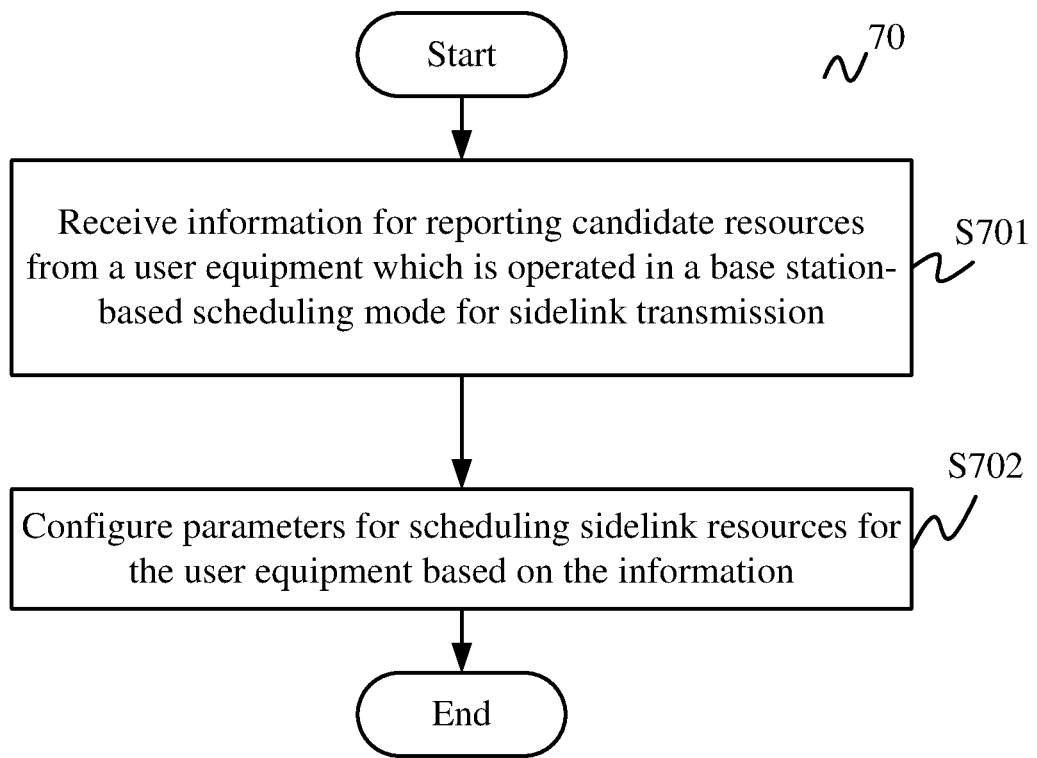
FIG. 7 illustrates a flowchart of a wireless communication method for a base station according to an embodiment of the present disclosure.

In another embodiment of the present disclosure, there is provided a wireless communication method 70 for a base station as shown in FIG. 7. FIG. 7 illustrates a flowchart of a wireless communication method 70 for a base station according to another embodiment of the present disclosure.

As shown in FIG. 7, the wireless communication method 70 starts at step S701 in which information for reporting candidate resources from a user equipment which is operated in a base station-based scheduling mode for sidelink transmission is received. Then, at step S702, parameters for scheduling sidelink resources for the user equipment are configured based on the information. After step S702, the wireless communication method 70 ends. Wherein, the reported candidate resources are at least part of the selected candidate resources for at least data channels which are selected by the user equipment from resources in a resource selection window based on the result of sensing performed in a sensing window which is before the resource selection window, the beginning time of the resource selection window being no earlier than a service arrival time, and wherein the selection of the candidate resources by the user equipment follows at least one of the following rules: the time period from the service arrival time to the ending time of the resource selection window is no greater than a threshold latency; for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement. For example, the wireless communication method 70 may be applied to eNB 101 as shown in FIG. 1.

According to an embodiment of the present disclosure, although not shown in FIG. 7, the wireless communication method 70 may further comprise receiving the beginning time and the ending time of the resource selection window from the user equipment.

According to an embodiment of the present disclosure, although not shown in FIG. 7, the wireless communication method 70 may further comprise: receiving information on service statistics from the user equipment, and determining the beginning time and the ending time of the resource selection window based on the information on service statistics.

According to an embodiment of the present disclosure, although not shown in FIG. 7, the wireless communication method 70 may further comprise receiving information on at least one of recommended Modulation and Coding Scheme (MCS), Physical Resource Block (PRB) number, retransmission number and power associated with the reported candidate resources from the user equipment.

According to an embodiment of the present disclosure, although not shown in FIG. 7, the wireless communication method 70 may further comprise configuring the granularity of the reported candidate resources.

According to an embodiment of the present disclosure, although not shown in FIG. 7, the wireless communication method 70 may further comprise transmitting a signaling to trigger the selection of the candidate resources by the user equipment to the user equipment.

With the wireless communication method 70, by configuring parameters for scheduling sidelink resources for the user equipment based on the information on candidate resources which are reported by mode-3 UEs based on the result of sensing while considering at least one of the above three factors, the resource pool sharing between mode-3 UEs and mode-4 UEs can be realized while improving resource utilization and reducing/avoiding collisions between mode-3 UEs and mode-4 UEs. Further, when all of the tree factors are considered, the candidate resources reported by the user equipment can guarantee proper sidelink transmission and satisfy CRB requirement and latency requirement.

It is noted that the base station is not necessarily to take into consideration of the information for reporting candidate resources from a user equipment when configuring parameters for scheduling sidelink resources for the user equipment.

Figure 8:
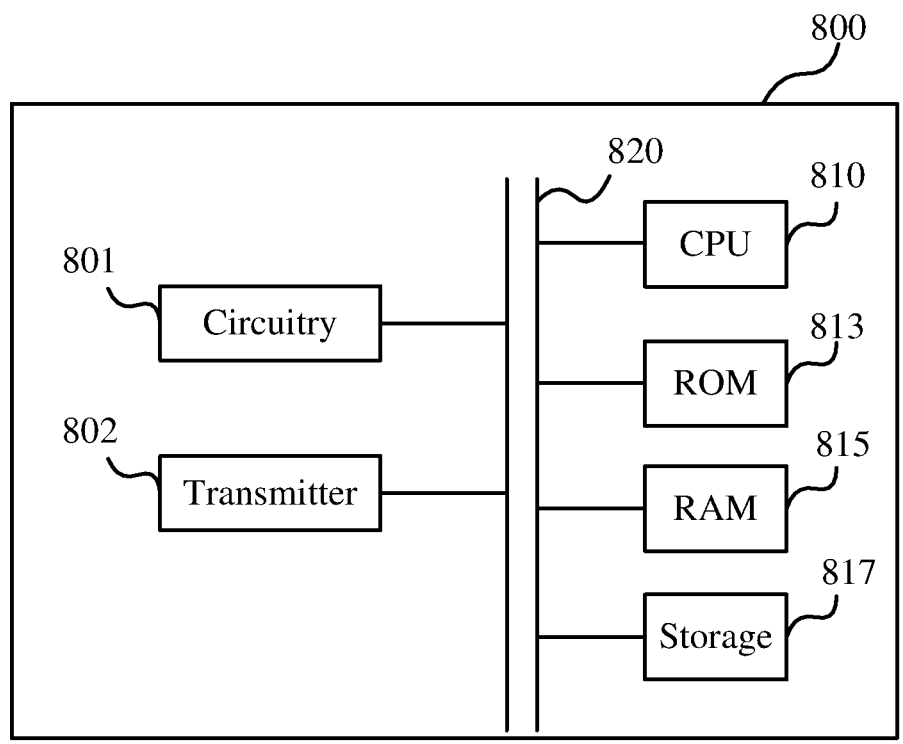
FIG. 8 illustrates a block diagram of a user equipment according to a further embodiment of the present disclosure.

In a further embodiment of the present disclosure, there is provided a user equipment 800 as shown in FIG. 8. FIG. 8 illustrates a block diagram of a user equipment 800 according to a further embodiment of the present disclosure. The user equipment 800 is operated in a base station-based scheduling mode for sidelink transmission.

As shown in FIG. 8, the user equipment 800 includes: a circuitry 801 operative to select candidate resources for at least data channels from resources in a resource selection window based on the result of sensing performed in a sensing window which is before the resource selection window, the beginning time of the resource selection window being no earlier than a service arrival time; and a transmitter 802 operative to report at least part of the selected candidate resources to a base station. In the circuitry 801, the selection of the candidate resources follows at least one of the following rules: the time period from the service arrival time to the ending time of the resource selection window is no greater than a threshold latency; for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement.

The user equipment 800 according to the present embodiment may further include a CPU (Central Processing Unit) 810 for executing related programs to process various data and control operations of respective units in the user equipment 800, a ROM (Read Only Memory) 813 for storing various programs required for performing various process and control by the CPU 810, a RAM (Random Access Memory) 815 for storing intermediate data temporarily produced in the procedure of process and control by the CPU 810, and/or a storage unit 817 for storing various programs, data and so on. The above circuitry 801, transmitter 802, CPU 810, ROM 813, RAM 815 and/or storage unit 817 etc. may be interconnected via data and/or command bus 820 and transfer signals between one another.

Respective units as described above do not limit the scope of the present disclosure. According to one embodiment of the disclosure, the functions of the above circuitry 801 and transmitter 802 may be implemented by hardware, and the above CPU 810, ROM 813, RAM 815 and/or storage unit 817 may not be necessary. Alternatively, part or all of functions of the above circuitry 801 or transmitter 802 may also be implemented by functional software in combination with the above CPU 810, ROM 813, RAM 815 and/or storage unit 817 etc.

Specifically, the user equipment 800 may be any one of mode-3 UEs 201, 202, 203 shown in FIG. 1 and may perform the wireless communication method 30 as described above in conjunction with FIG. 3.

With the user equipment 800, by selecting and reporting to a base station candidate resources by mode-3 UEs based on the result of sensing while considering at least one of the above three factors, the resource pool sharing between mode-3 UEs and mode-4 UEs can be realized while improving resource utilization and reducing/avoiding collisions between mode-3 UEs and mode-4 UEs. Further, when all of the tree factors are considered, the candidate resources reported by using the wireless communication method 30 can guarantee proper sidelink transmission and satisfy CRB requirement and latency requirement.

Note that, the other technical features in the above wireless communication method 30 can also be incorporated in the user equipment 800 and will not be described here for avoid redundancy.

Figure 9:
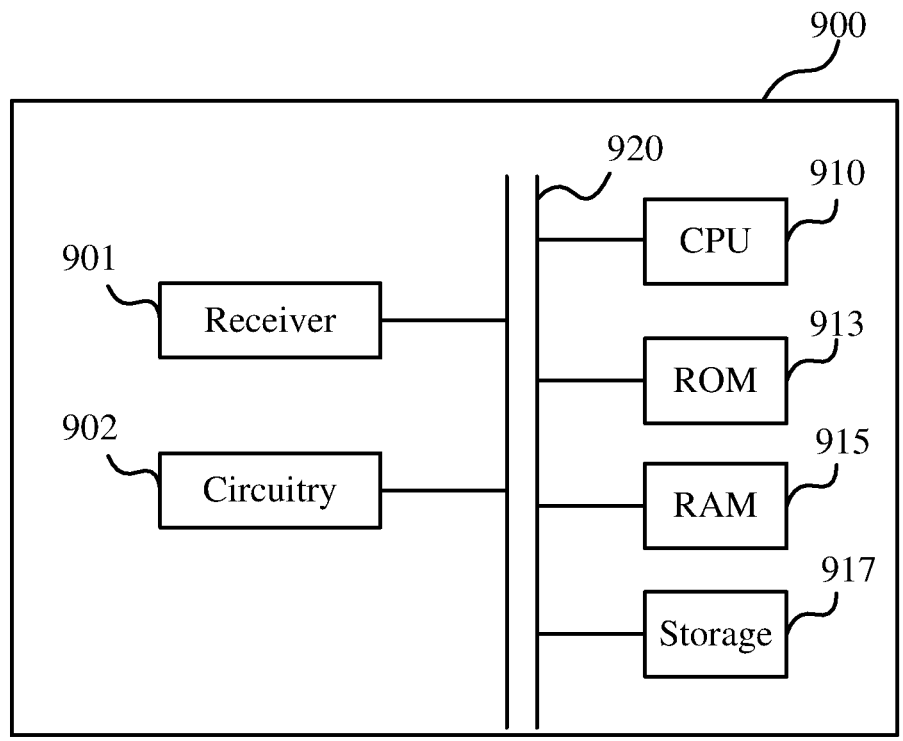
FIG. 9 illustrates a block diagram of a base station according to another embodiment of the present disclosure.

In another embodiment of the present disclosure, there is provided a base station 900 as shown in FIG. 9. FIG. 9 illustrates a block diagram of a base station 900 according to another embodiment of the present disclosure.

As shown in FIG. 9, the base station 900 includes: a receiver 901 operative to receive information for reporting candidate resources from a user equipment which is operated in a base station-based scheduling mode for sidelink transmission; and a circuitry 902 operative to configure parameters for scheduling sidelink resources for the user equipment based on the information. And, the reported candidate resources are at least part of the selected candidate resources for at least data channels which are selected by the user equipment from resources in a resource selection window based on the result of sensing performed in a sensing window which is before the resource selection window, the beginning time of the resource selection window being no earlier than a service arrival time, and wherein the selection of the candidate resources by the user equipment follows at least one of the following rules: the time period from the service arrival time to the ending time of the resource selection window is no greater than a threshold latency; for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement.

The base station 900 according to the present embodiment may further include a CPU (Central Processing Unit) 910 for executing related programs to process various data and control operations of respective units in the base station 900, a ROM (Read Only Memory) 913 for storing various programs required for performing various process and control by the CPU 910, a RAM (Random Access Memory) 915 for storing intermediate data temporarily produced in the procedure of process and control by the CPU 910, and/or a storage unit 917 for storing various programs, data and so on. The above receiver 901, circuitry 902, CPU 910, ROM 913, RAM 915 and/or storage unit 917 etc. may be interconnected via data and/or command bus 920 and transfer signals between one another.

Respective units as described above do not limit the scope of the present disclosure. According to one embodiment of the disclosure, the functions of the above receiver 901 and circuitry 902 may be implemented by hardware, and the above CPU 910, ROM 913, RAM 915 and/or storage unit 917 may not be necessary. Alternatively, part or all of functions of the above receiver 901 and/or circuitry 902 may also be implemented by functional software in combination with the above CPU 910, ROM 913, RAM 915 and/or storage unit 917 etc.

Specifically, the base station 900 may be eNB 101 shown in FIG. 1 and may perform the wireless communication method 70 as described above in conjunction with FIG. 7.

With the base station 900, by configuring parameters for scheduling sidelink resources for the user equipment based on the information on candidate resources which are reported by mode-3 UEs based on the result of sensing while considering at least one of the above three factors, the resource pool sharing between mode-3 UEs and mode-4 UEs can be realized while improving resource utilization and reducing/avoiding collisions between mode-3 UEs and mode-4 UEs. Further, when all of the tree factors are considered, the candidate resources reported by the user equipment can guarantee proper sidelink transmission and satisfy CRB requirement and latency requirement.

Note that, the other technical features in the above wireless communication method 70 can also be incorporated in the base station 900 and will not be described here for avoid redundancy.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined. Embodiments of the present disclosure can at least provide the following subject matters.

(1). A user equipment which is operated in a base station-based scheduling mode for sidelink transmission, comprising:

circuitry operative to select candidate resources for at least data channels from resources in a resource selection window based on the result of sensing performed in a sensing window which is before the resource selection window, the beginning time of the resource selection window being no earlier than a service arrival time; and a transmitter operative to report at least part of the selected candidate resources to a base station, wherein the selection of the candidate resources follows at least one of the following rules:

the time period from the service arrival time to the ending time of the resource selection window is no greater than a threshold latency;

for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement.

(2). The user equipment according to (1), wherein the transmitter is further operative to report at least one of recommended Modulation and Coding Scheme (MCS), Physical Resource Block (PRB) number, retransmission number and power associated with the reported candidate resources to the base station.

(3). The user equipment according to (1), wherein the granularity of the reported candidate resources is configured by the base station.

(4). The user equipment according to (1), wherein the selection of the candidate resources is triggered by a signaling from the base station or by an event or condition.

(5). The user equipment according to (1), wherein the at least part of the selected candidate resources is reported periodically or aperiodically.

(6). The user equipment according to (1), the at least part of the selected candidate resources is reported after the resource selection window.

(7). The user equipment according to (1), wherein the selection of candidate resources are performed over a plurality of resource selection windows, and after the plurality of resource selection windows, the at least part of the selected candidate resources is reported based on all of results of the selection of candidate resources performed over the plurality resource selection windows.

(8). The user equipment according to (1), wherein the beginning time and the ending time of the resource selection window is obtained by the base station implicitly from service statistics reported by the user equipment.

(9). The user equipment according to (1), wherein the transmitter is further operative to report the beginning time and the ending time of the resource selection window to the base station.

(10). A wireless communication method for a user equipment which is operated in a base station-based scheduling mode for sidelink transmission, comprising:

selecting candidate resources for at least data channels from resources in a resource selection window based on the result of sensing performed in a sensing window which is before the resource selection window, the beginning time of the resource selection window being no earlier than a service arrival time; and reporting at least part of the selected candidate resources to a base station, wherein the selection of the candidate resources follows at least one of the following rules:

the time period from the service arrival time to the ending time of the resource selection window is no greater than a threshold latency;

for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and the selected candidate resources and associated radio parameters meet a Channel Business Ratio (CBR) requirement.

(11). The wireless communication method according to (10), further comprising reporting at least one of recommended Modulation and Coding Scheme (MCS), Physical Resource Block (PRB) number, retransmission number and power associated with the reported candidate resources to the base station.

(12). The wireless communication method according to (10), wherein the granularity of the reported candidate resources is configured by the base station.

(13). The wireless communication method according to (10), wherein the selection of the candidate resources is triggered by a signaling from the base station or by an event or condition.

(14). The wireless communication method according to (10), wherein the at least part of the selected candidate resources is reported periodically or aperiodically.

(15). The wireless communication method according to (10), wherein the at least part of the selected candidate resources is reported after the resource selection window.

(16). The wireless communication method according to (10), wherein the selection of candidate resources are performed over a plurality of resource selection windows, and after the plurality of resource selection windows, the at least part of the selected candidate resources is reported based on all of results of the selection of candidate resources performed over the plurality resource selection windows.

(17). The wireless communication method according to (10), wherein the beginning time and the ending time of the resource selection window is obtained by the base station implicitly from service statistics reported by the user equipment.

(18). The wireless communication method according to (10), further comprising reporting the beginning time and the ending time of the resource selection window to the base station.

(19). A base station, comprising:
a receiver operative to receive information for reporting candidate resources from a user equipment which is operated in a base station-based scheduling mode for sidelink transmission; and
a circuitry operative to configure parameters for scheduling sidelink resources for the user equipment based on the information, wherein
the reported candidate resources are at least part of the selected candidate resources for at least data channels which are selected by the user equipment from resources in a resource selection window based on the result of sensing performed in a sensing window which is before the resource selection window, the beginning time of the resource selection window being no earlier than a service arrival time, and wherein
the selection of the candidate resources by the user equipment follows at least one of the following rules:
the time period from the service arrival time to the ending time of the resource selection window is no greater than a threshold latency;
for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and
the selected candidate resources and associated radio parameters meet a Channel Business Ratio (CBR) requirement.

(20). The base station according to (19), wherein the receiver is further operative to receive the beginning time and the ending time of the resource selection window from the user equipment.

(21). The base station according to (19), wherein the receiver is further operative to receive information on service statistics from the user equipment, and the circuitry is further operative to determine the beginning time and the ending time of the resource selection window based on the information on service statistics.

(22). The base station according to (19), wherein the receiver is further operative to receive information on at least one of recommended Modulation and Coding Scheme (MCS), Physical Resource Block (PRB) number, retransmission number and power associated with the reported candidate resources from the user equipment.

(23). The base station according to (19), wherein the circuitry is further operative to configure the granularity of the reported candidate resources.

(24). The base station according to (19), further comprising a transmitter operative to transmit a signaling to trigger the selection of the candidate resources by the user equipment to the user equipment.

(25). A wireless communication method for a base station, comprising:
receiving information for reporting candidate resources from a user equipment which is operated in a base station-based scheduling mode for sidelink transmission; and
configuring parameters for scheduling sidelink resources for the user equipment based on the information, wherein
the reported candidate resources are at least part of the selected candidate resources for at least data channels which are selected by the user equipment from resources in a resource selection window based on the result of sensing performed in a sensing window which is before the resource selection window, the beginning time of the resource selection window being no earlier than a service arrival time, and wherein
the selection of the candidate resources by the user equipment follows at least one of the following rules:
the time period from the service arrival time to the ending time of the resource selection window is no greater than a threshold latency;
for a case of non-adjacent scheduling between a data channel and a control channel, both the interference of the selected candidate resource for a data channel and the interference of the resource for a control channel which is uniquely mapped with the data channel are no greater than a threshold interference, or for a case of adjacent scheduling between a data channel and a control channel, the interference of the selected candidate resource for a data channel is no greater than a threshold interference; and
the selected candidate resources and associated radio parameters meet a Channel Business Ratio (CBR) requirement.

(26). The wireless communication method according to (25), further comprising receiving the beginning time and the ending time of the resource selection window from the user equipment.

(27). The wireless communication method according to (25), further comprising:
receiving information on service statistics from the user equipment, and
determining the beginning time and the ending time of the resource selection window based on the information on service statistics.

(28). The wireless communication method according to (25), further comprising receiving information on at least one of recommended Modulation and Coding Scheme (MCS), Physical Resource Block (PRB) number, retransmission number and power associated with the reported candidate resources from the user equipment.

(29). The wireless communication method according to (25), wherein further comprising configuring the granularity of the reported candidate resources.

(30). The wireless communication method according to (25), further comprising transmitting a signaling to trigger the selection of the candidate resources by the user equipment to the user equipment.

The invention claimed is:
1. A user equipment which is operated in a base station-based scheduling mode for sidelink transmission, comprising:
circuitry which, in operation, selects candidate resources for at least data channels, from resources in a resource selection window, based on a result of sensing performed in a sensing window, the sensing window being before the resource selection window, and a beginning time of the resource selection window being no earlier than a service arrival time; and
a transmitter which, in operation, reports at least part of the selected candidate resources to a base station, wherein the circuitry, in operation, selects the candidate resources using at least one rule of rules including:
a time period from the service arrival time to an ending time of the resource selection window is not greater than a threshold latency;
for a case of non-adjacent scheduling between a data channel and a control channel, both an interference of a selected candidate resource for the data channel and an interference of the selected candidate resource for the control channel which is uniquely mapped with the data channel are not greater than a threshold interference, or for a case of adjacent scheduling between the data channel and the control channel, the interference of the selected candidate resource for the data channel is not greater than the threshold interference; and
the selected candidate resources and associated radio parameters meet a Channel Business Ratio (CBR) requirement, and
the transmitter, in operation, reports the beginning time and the ending time of the resource selection window to the base station.

2. The user equipment according to claim 1, wherein the transmitter is further operative to report at least one of recommended Modulation and Coding Scheme (MCS), Physical Resource Block (PRB) number, retransmission number and power associated with the reported candidate resources to the base station.

3. The user equipment according to claim 1, wherein a granularity of the reported candidate resources is configured by the base station.

4. The user equipment according to claim 1, wherein the selection of the candidate resources is triggered by a signaling from the base station or by an event or condition.

5. The user equipment according to claim 1, wherein the at least part of the selected candidate resources is reported periodically or aperiodically.

6. The user equipment according to claim 1, the at least part of the selected candidate resources is reported after the resource selection window.

7. The user equipment according to claim 1, wherein the selection of candidate resources are performed over a plurality of resource selection windows, and after the plurality of resource selection windows, the at least part of the selected candidate resources is reported based on all of results of the selection of candidate resources performed over the plurality of resource selection windows.

8. The user equipment according to claim 1, wherein the beginning time and the ending time of the resource selection window is obtained by the base station implicitly from service statistics reported by the user equipment.

9. A wireless communication method for a user equipment which is operated in a base station-based scheduling mode for sidelink transmission, comprising:
selecting candidate resources for at least data channels from resources in a resource selection window based on a result of sensing performed in a sensing window, the sensing window being before the resource selection window, and a beginning time of the resource selection window being no earlier than a service arrival time;
reporting at least part of the selected candidate resources to a base station; and
reporting the beginning time and an ending time of the resource selection window to the base station, wherein selecting the candidate resources uses at least one rule of rules including:
a time period from the service arrival time to the ending time of the resource selection window is not greater than a threshold latency;
for a case of non-adjacent scheduling between a data channel and a control channel, both an interference of a selected candidate resource for the data channel and an interference of the selected candidate resource for the control channel which is uniquely mapped with the data channel are not greater than a threshold interference, or for a case of adjacent scheduling between the data channel and the control channel, the interference of the selected candidate resource for the data channel is not greater than the threshold interference; and
the selected candidate resources and associated radio parameters meet a Channel Business Ratio (CBR) requirement.

10. The wireless communication method according to claim 9, further comprising reporting at least one of recommended Modulation and Coding Scheme (MCS), Physical Resource Block (PRB) number, retransmission number and power associated with the reported candidate resources to the base station.

11. The wireless communication method according to claim 9, wherein a granularity of the reported candidate resources is configured by the base station.

12. The wireless communication method according to claim 9, wherein the selection of the candidate resources is triggered by a signaling from the base station or by an event or condition.

13. The wireless communication method according to claim 9, wherein the at least part of the selected candidate resources is reported after the resource selection window.

14. The wireless communication method according to claim 9, wherein the selection of candidate resources are performed over a plurality of resource selection windows, and after the plurality of resource selection windows, the at least part of the selected candidate resources is reported based on all of results of the selection of candidate resources performed over the plurality of resource selection windows.

15. The wireless communication method according to claim 9, wherein the beginning time and the ending time of the resource selection window is obtained by the base station implicitly from service statistics reported by the user equipment.

16. A base station, comprising:
a receiver which, in operation, receives information for reporting candidate resources from a user equipment which is operated in a base station-based scheduling mode for sidelink transmission; and
a circuitry which, in operation, configures parameters for scheduling sidelink resources for the user equipment based on the information, wherein
the reported candidate resources are at least part of selected candidate resources for at least data channels which are selected by the user equipment from resources in a resource selection window based on a result of sensing performed in a sensing window, the sensing window being before the resource selection window, and a beginning time of the resource selection window being no earlier than a service arrival time, and wherein
the selection of the candidate resources by the user equipment uses at least one rule of rules including:
a time period from the service arrival time to an ending time of the resource selection window is not greater than a threshold latency;

for a case of non-adjacent scheduling between a data channel and a control channel, both an interference of a selected candidate resource for the data channel and an interference of the selected candidate resource for the control channel which is uniquely mapped with the data channel are not greater than a threshold interference, or for a case of adjacent scheduling between the data channel and the control channel, the interference of the selected candidate resource for the data channel is not greater than the threshold interference; and the selected candidate resources and associated radio parameters meet a Channel Business Ratio (CBR) requirement, the receiver, in operation, receives the beginning time and the ending time of the resource selection window from the user equipment.

17. The base station according to claim 16, wherein the receiver is further operative to receive information on service statistics from the user equipment, and the circuitry is further operative to determine the beginning time and the ending time of the resource selection window based on the information on service statistics.

* * * * *